Aug. 25, 1931. V. ELKINGTON 1,820,127
MANHOLE COVER AND FRAME AND THE LIKE
Filed Dec. 1, 1928 7 Sheets-Sheet 4
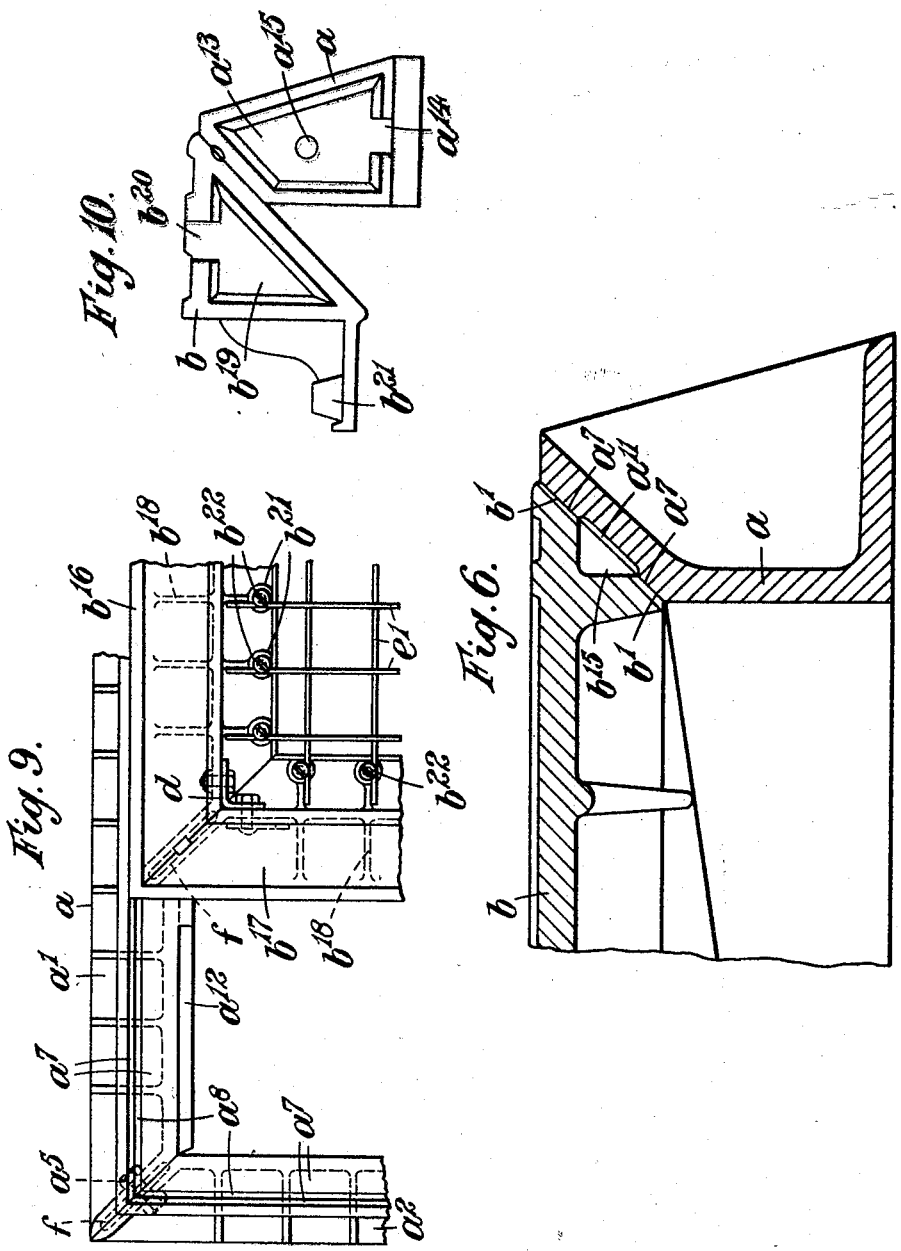
Inventor
Vivian Elkington Aug. 25, 1931.  V. ELKINGTON  1,820,127
MANHOLE COVER AND FRAME AND THE LIKE
Filed Dec. 1, 1928   7 Sheets-Sheet 5
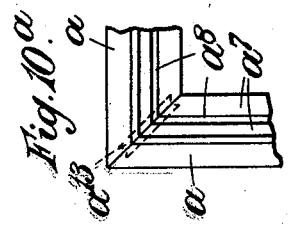
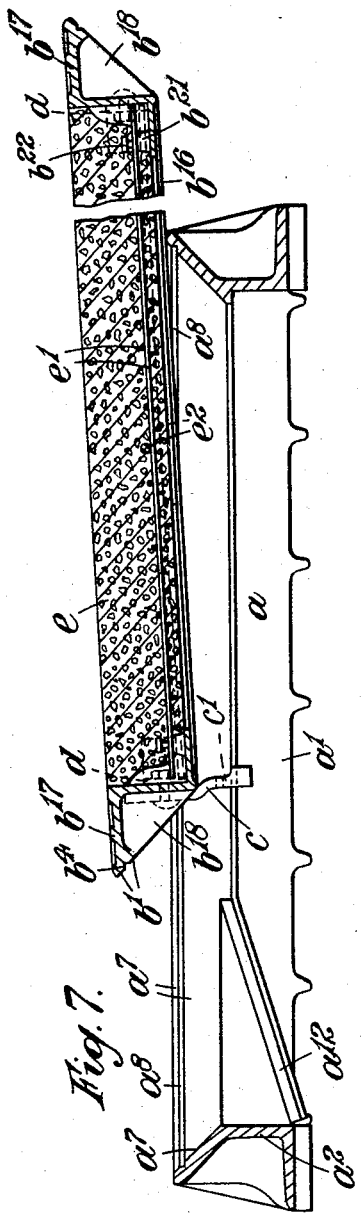
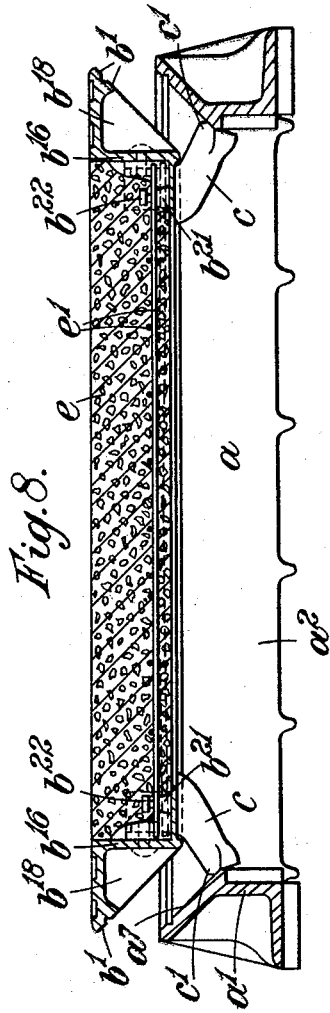
Inventor
Vivian Elkington
By
Attorney.

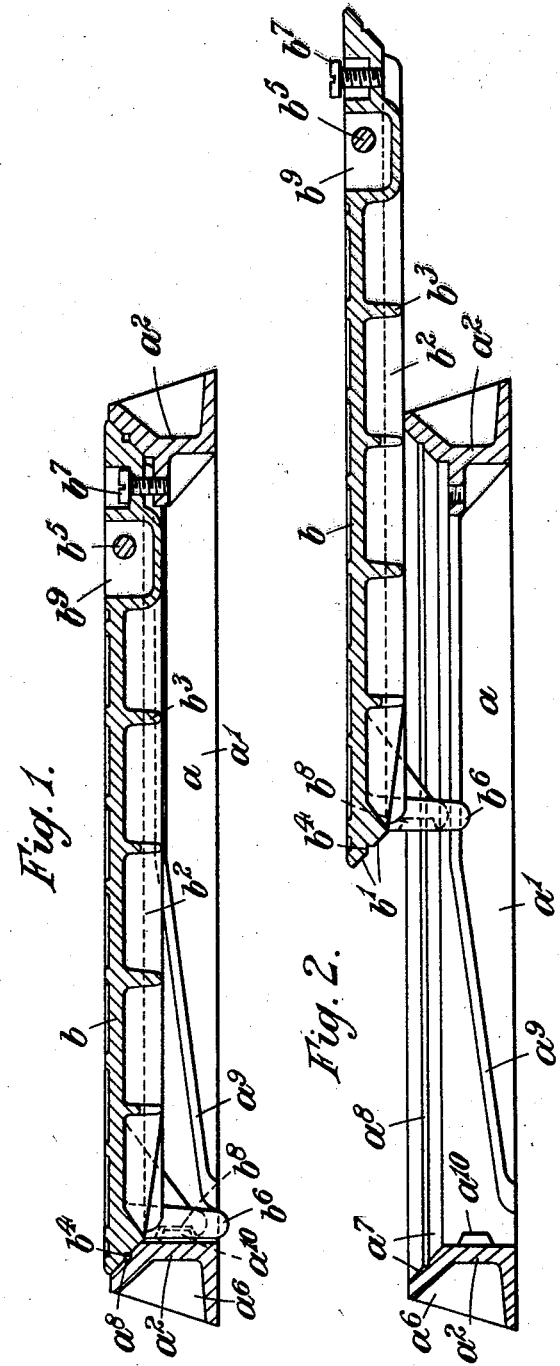

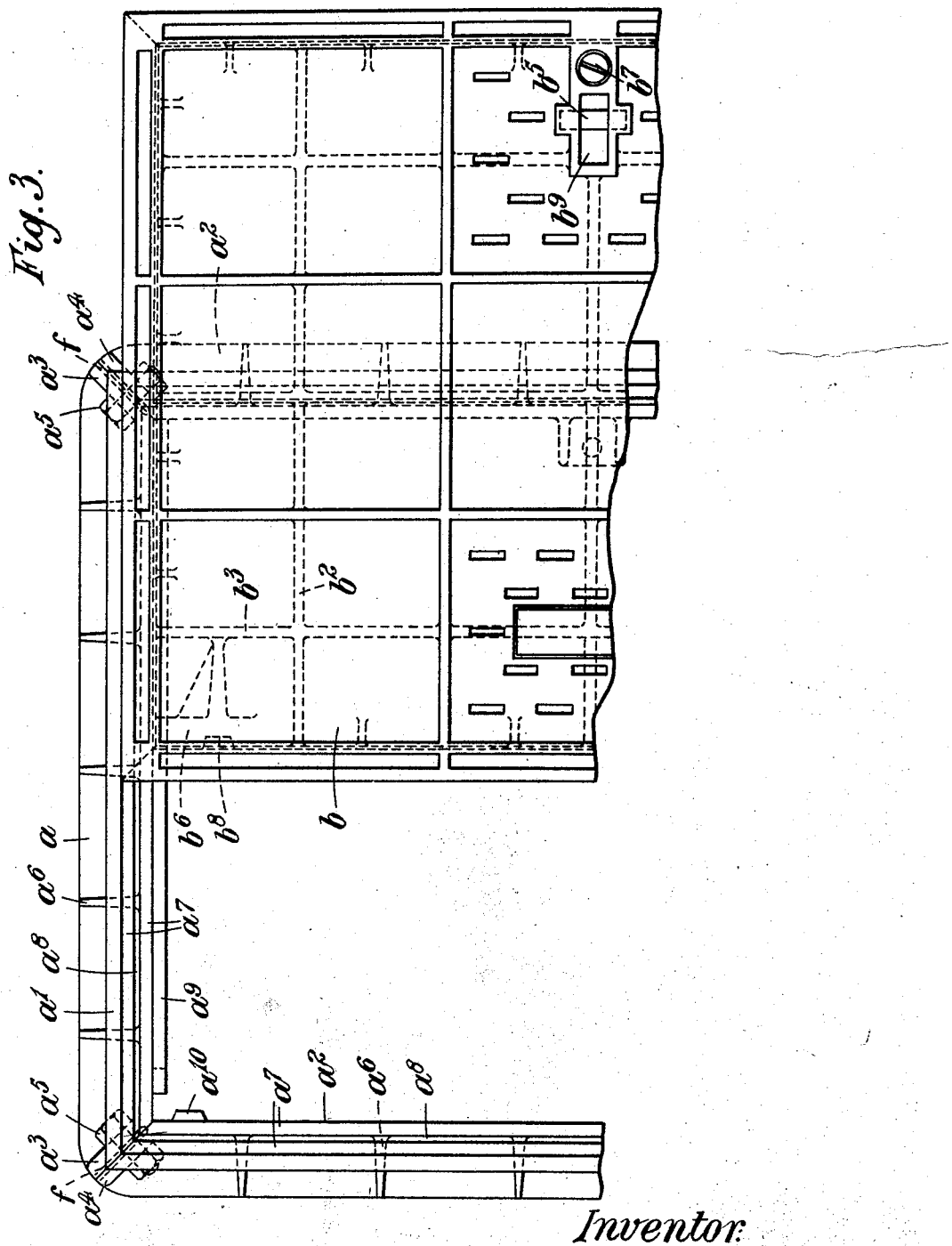

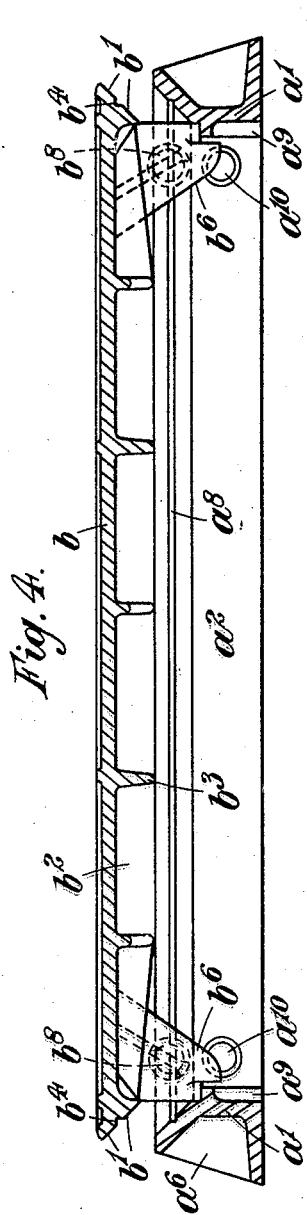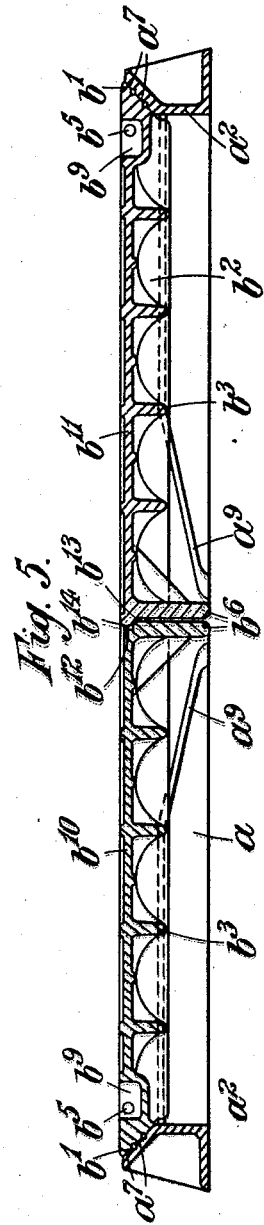

Aug. 25, 1931.    V. ELKINGTON    1,820,127
MANHOLE COVER AND FRAME AND THE LIKE
Filed Dec. 1, 1928    7 Sheets-Sheet 6
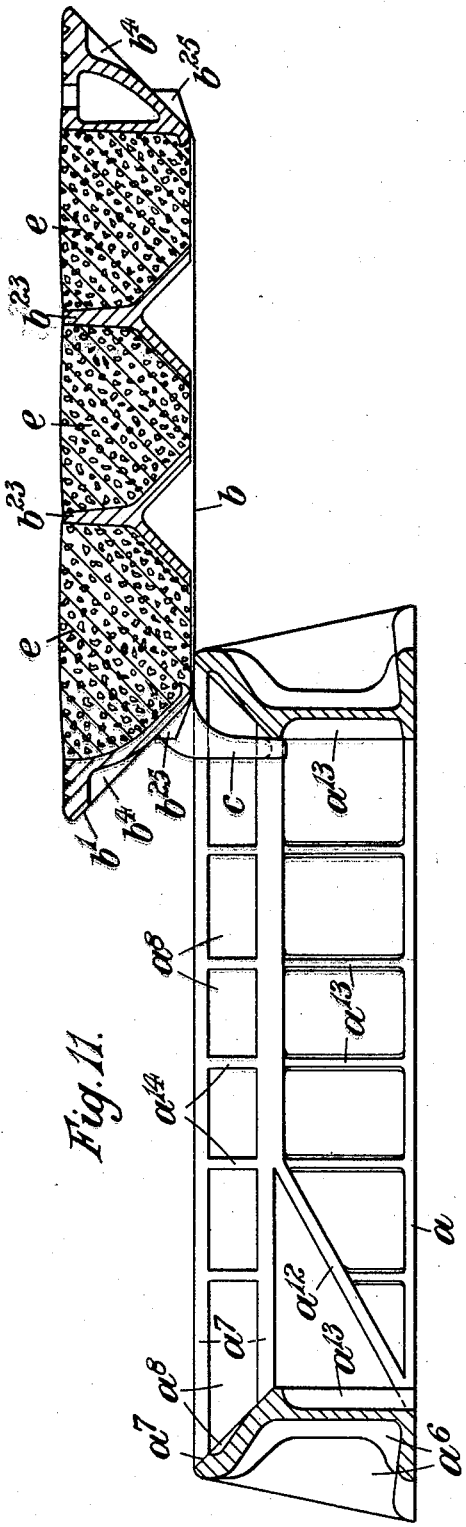
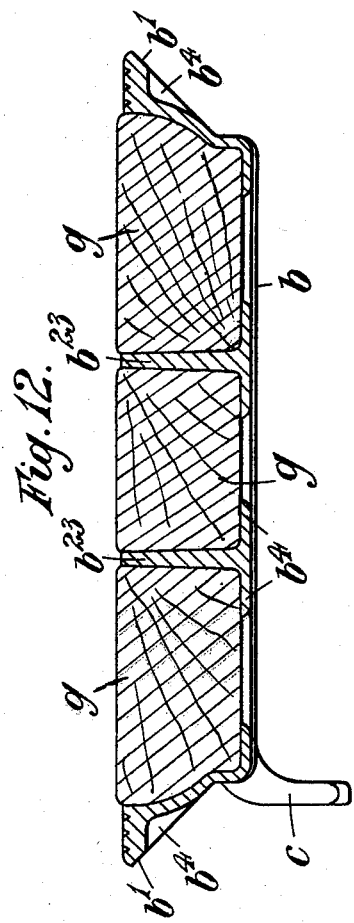
Inventor:
Vivian Elkington
By
Attorney.

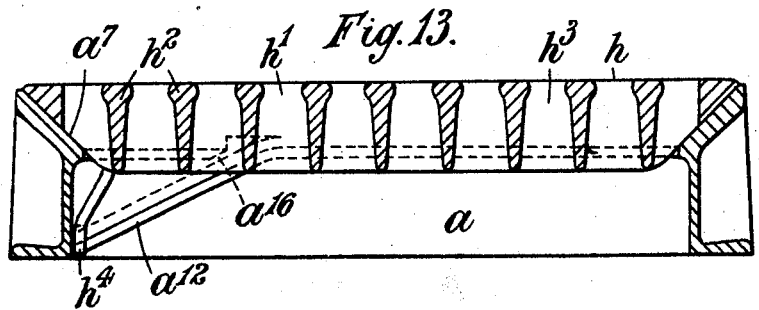
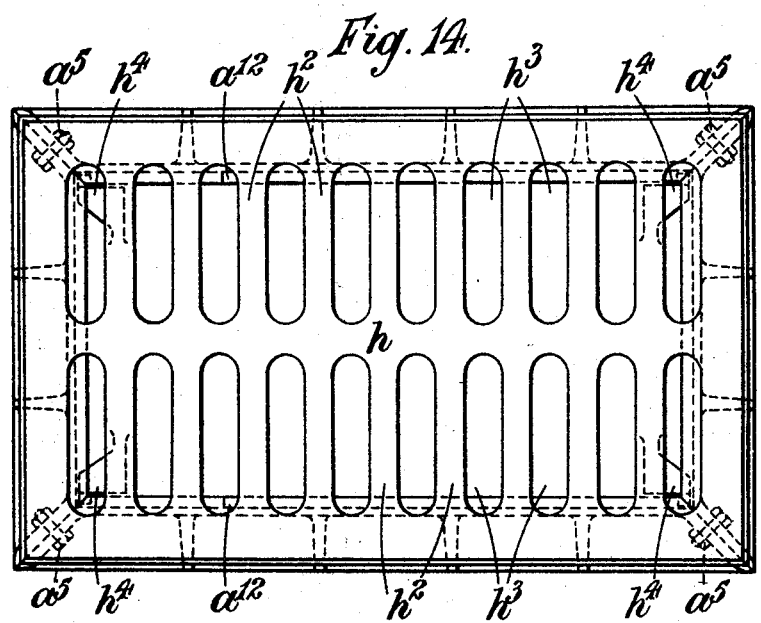
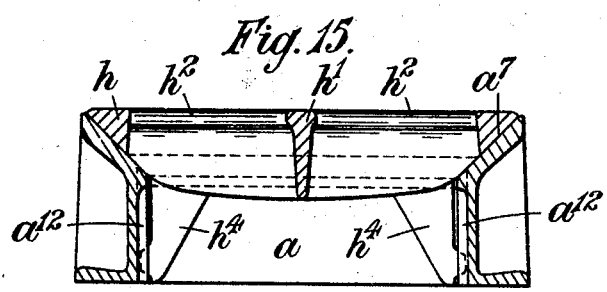

Patented Aug. 25, 1931

1,820,127

UNITED STATES PATENT OFFICE

VIVIAN ELKINGTON, OF ST. MARGARETS BAY, ENGLAND

MANHOLE COVER AND FRAME AND THE LIKE

Application filed December 1, 1928, Serial No. 323,013, and in Great Britain March 5, 1928.

This invention relates to rectangular manhole covers and the like such as pathway, roadway and like covers or gratings for gas, water, electricity or sewage or analogous installations, and has among its objects to provide an improved construction of rectangular cover or the like whereby the seatings may be readily and accurately cast and, if necessary, fettled, ground or machined so that the cover or the like seats truly upon its frame, ensuring great strength and resistance to breakage, avoiding rocking and enabling a water and/or gas tight joint to be secured without the use of liquid seals. The invention is equally applicable to rectangular manhole or inspection covers for bulk storage installation and tanks for the reception of petrol, oil, paraffin and other inflammable fluids where it is necessary that the covers should be water tight, inasmuch as the leakage of water and foreign matter past the cover causes corrosion of the tank top or the like and risk of subsequent explosion. Furthermore, the cover according to the present invention is more readily removable in case of accident than the cover at present in general use. The invention is furthermore applicable to rectangular concrete or wood block filled covers such as are used for electric cable junction boxes and the like.

The covers and frames at present in general use are made so that the cover or the like, when in position, is inside the frame. Consequently as the covers and frames are made generally of cast iron or of cast semi-steel, or are built up in part of cast iron and in part of chequered steel plate, the covers must be made with sufficient clearance to allow for irregularities in casting such material, and for expansion due to heat, so as to avoid jamming in the frame, and in cases where hinged covers and frames are used, with space behind the hinge to allow freedom of movement. The seatings are usually flat and the cover rests on chipping strips or may bed metal to metal, or it may rest on india-rubber, white metal or lead or fibre; one or more hydraulic or grease seals formed by a flange or flanges on the cover dipping into a cavity or cavities filled with grease or water being generally necessary. In all cases, however, clearance must be allowed between the sides of the cover and the frame; and these clearance spaces, more especially in the case of covers and frames provided with liquid seals, become filled with dirt which, when the cover is opened, falls into the bottom of the seal grooves and is difficult to remove, especially in covers and under-hinges, and results, when the cover is replaced, in uneven bearing, rocking and breakage. Inasmuch as for heavy traffic the seating is cast inside the frame and at a substantial distance down, and it is practically impossible to secure a casting with a true and uniform seating surface, it is very difficult and expensive to trim and true the seating to enable the cover to bed evenly. Consequently, owing to the increased axle load of modern traffic, covers and frames have to be of very heavy construction so that where the covers are of any substantial area it is very difficult to lift or to remove them.

In order to overcome the disadvantages referred to, it has before been proposed to provide manhole and like covers with bevelled edges forming inclined seatings co-operating with corresponding inclined seatings at the upper edge of the frame so that the cover rests upon the frame without clearance. Inasmuch, however, as it is practically impossible to cast the complete or one-piece frame and cover even in chills with perfectly true seatings, and to ensure that the contraction of each will be exactly similar even if cast from the same pot of metal, and inasmuch as, furthermore, machining of the inclined seating in a complete frame is very difficult and costly, it has been necessary heretofore to employ the usual liquid seal, comprising a flange on the cover dipping into a cavity filled with grease or water, in conjunction with the inclined seatings.

According to the present invention the frame of a rectangular manhole or like cover or grating having bevelled or inclined seating faces is constructed in parts or sections adapted to be bolted or otherwise fitted together at the corners in any suitable manner. The construction of the frame in parts which conveniently are of a cross section which facilitates accurate casting, enables the seating faces to be readily fettled, ground or machined if necessary so as to secure perfectly true seatings. Furthermore, the moulding and casting operations are greatly simplified so that the cost of production as compared with one-piece frames may be materially reduced. The seatings in the frame are bevelled or inclined inwardly and downwardly, for example at an angle of 45°, preferably from the upper surface of the frame and preferably from positions at or adjacent the upper outer edges thereof. The cover may be made in one piece, advantageously ribbed or webbed heavily longitudinally and transversely, which ribs or webs extend to and buttress or support corresponding bevelled or inclined seating faces which, it will be understood, can be easily fettled, ground or machined, or the cover may be made similarly to the frame in four parts adapted to be fitted together at the corners, preferably by mitre joints. This sectional construction of the frame and of the cover is especially adapted for concrete filled covers and, moreover, enables a large number of different sized manhole covers or the like to be built up from sections in a range of stock sizes. The mitred ends of the sections may be fettled, ground or machined; and in order to ensure accurate bedding of the frames and covers, the mitred ends of the sections may be provided with recesses of suitable form, preferably undercut, adapted when the sections are assembled together to form chambers for the reception of a metal such as hardened lead or type metal poured into the chambers through suitable apertures to key the sections together. When the sections are bolted and keyed together in the manner described a perfectly rigid construction is secured. The frame sections may be assembled upon a "master" block having inclined seatings corresponding to the cover or grating, and the cover, when constructed in sections, may then be assembled directly upon the frame. Alternatively the cover sections may be assembled on a "master" block and the frame sections then fitted to the assembled cover. If the cover or grating is made in one piece the frame may be assembled directly thereon, the "master" block being unnecessary.

According to the invention, moreover, the co-operating seatings in the frame and on the cover may be provided if necessary with one or more oppositely disposed grooves or recesses adapted, when containing grease, to form a seal in known manner. By such means an absolutely water and gas tight cover may be secured. Such grooves or recesses are obviously not required for use with ventilated manholes or gratings or the like.

Furthermore according to the invention, means are provided whereby the removal and replacement of the cover or grating or the like may be facilitated. For this purpose the cover or grating or the like may be provided at or adjacent one end with one or more lifting handles or hook or key slots or the equivalent, and at the opposite end it may be provided with downwardly extending projections adapted to co-operate with tracks or ledges provided upon the inner faces of opposite sides of the frames, the tracks or ledges being so arranged that when the cover or grating is lifted the depth of the seat by means of the handle or handles or the equivalent and is pulled longitudinally away from the frame, the end of the cover or grating further from the lifting means is raised by the engagement of the downwardly extending projections aforesaid with the tracks or ledges so that the cover or grating is raised and held clear of the seatings in the frame during its removal and replacement. By such means the cover or grating may be removed and replaced with the minimum of exertion; and as it slides on the tracks and on ribs cast underneath the cover or grating, the inclined seatings are prevented from becoming damaged or from being fouled by contact with the ground. The cover or grating may, if desired, be held in the closed position by any suitable construction of locking or fastening devices.

The invention is hereinafter described, by way of example, with reference to the accompanying diagrammatic drawings, in which:—

Figure 1 is a sectional elevation of a manhole frame and cover according to the invention, with the cover in closed position.

Figure 2 is a similar view showing the cover partly open.

Figure 3 is a fragmental plan view of Figure 2.

Figure 4 is a cross section of Figure 2.

Figure 5 is a longitudinal section of a modified construction of manhole frame and cover according to the invention, in which the cover is constructed in two halves.

Figure 6 is a detail cross sectional view illustrating a modified form of the seating faces applicable to the construction shown in the preceding figures.

Figure 7 is a sectional elevation similar to Figure 2 illustrating the application of the invention to a concrete filled cover.

Figure 8 is a cross section of Figure 7.

Figure 9 is a fragmental plan view of Figure 7, with the concrete filling omitted.

Figure 10 is a detail view illustrating the arrangement of recesses in the ends of the frame and cover sections for the reception of the metal keys.

Figure 10a is a fragmental plan view on an enlarged scale illustrating a modified form of the recesses shown in Figure 10.

Figure 11 is a view similar to Figure 2 illustrating a concrete filled cover according to the invention adapted more particularly for withstanding the weight of heavy traffic.

Figure 12 is a sectional elevation of a modified construction of the cover shown in Figure 11 adapted for the reception of wood filling blocks.

Figure 13 is a view similar to Figure 1 illustrating the application of the invention to a street or like grating.

Figure 14 is a plan view corresponding to Figure 13, and

Figure 15 is a cross section corresponding to Figure 14.

In carrying the invention into effect according to one construction and with reference to Figures 1 to 4, the frame $a$ is constructed of four sections, i. e. two side members $a^1$ and two end members $a^2$, cast with mitred ends or flanges $a^3$, $a^4$ respectively and adapted to be secured together at the corners by means of bolts $a^5$ extending through holes in the respective mitred flanges $a^3$, $a^4$. The members $a^1$, $a^2$ are preferably made of the cross section shown in the drawings, or of an equivalent cross section which facilitates the moulding and casting operations, and may be adapted to form a key for the road or bedding material, and preferably they are also formed with vertical ribs $a^6$ which strengthen and support the inclined seating $a^7$ and so enable a comparatively light construction to be employed. Preferably the inclined seating faces $a^7$, which extend downwardly and inwardly from positions at or adjacent the upper outer edges of the frame $a$, are disposed at an angle of approximately 45° to the horizontal, but any other suitable angle, for example 60°, may be employed.

The cover $b$ may be constructed in one piece as shown or made in parts, similarly to the frame $a$, and is provided with correspondingly bevelled or inclined seating faces $b^1$ so that when dropped into position it rests upon the inclined seating faces $a^7$ of the frame $a$. The cover $b$ is formed with longitudinal and transverse strengthening ribs $b^2$, $b^3$ respectively to give the cover greater rigidity and resistance to deflection under load, and such ribs preferably extend in alignment with the strengthening ribs $a^6$ of the frame when the cover is closed so that the maximum strength and rigidity of the cover and frame may be secured.

The respective seating faces $a^7$, $b^1$ may be provided with one or more co-operating oppositely disposed grooves or recesses $a^8$, $b^4$, respectively, adapted, when in registration and containing grease, to form a seal in known manner ensuring the prevention of inlet of water or escape of gas.

In order to facilitate the opening and closing of the cover $b$, the latter is provided adjacent one end with a lifting handle $b^5$, or handles or the equivalent, of usual construction and, adjacent the other end, is provided with downwardly projecting parts $b^6$ adapted to run upon ledges $a^9$ extending inwardly from the inner faces of the opposite side members $a^1$ and forming tracks. The tracks $a^9$ may extend from positions at or adjacent the positions at which the downwardly projecting parts $b^6$ on the cover $b$ are normally disposed, that is, when the cover $b$ is closed, and are inclined upwardly from these positions to an intermediate position in the length of the frame $a$ and then extend horizontally to the opposite end of the frame. To open the cover $b$, the screw $b^7$ or other locking device is unfastened and the adjacent end of the cover is slightly raised by engaging the handle $b^5$ by a suitable tool so that the end of the cover clears the seating faces $a^7$ at the respective end of the frame $a$ and the cover $b$ is then pulled longitudinally away from the frame, whereupon the projections $a^{10}$ on the inner face of the opposite end frame member $a^2$ are disengaged from the co-operating recesses $b^8$ in the respective downwardly extending projecting parts $b^6$ on the underside of the cover $b$, and the parts $b^6$ engage with the inclined parts of the tracks $a^9$. During the longitudinal movement of the cover $b$ with respect to the frame $a$, the cover is gradually raised as the parts $b^6$ ride up upon the tracks $a^9$ to the position indicated in Figure 2, from which position the parts $b^6$ run upon the horizontal parts of the tracks $a^9$. The longitudinal ribs $b^2$ beneath the cover $b$ act as runners supporting the cover in its movement upon the end member $a^2$ of the frame $a$ adjacent the locking device. The ribs $b^2$ also serve to protect the castings and the edges thereof from damage and to maintain the seating face $b^1$ clear of the ground when the cover is fully open, and said ribs are of sufficient depth to prevent the handle recess $b^9$ from contacting with the seating $a^7$ at the respective end of the frame. The tracks $a^9$ may be inclined from end to end, in which case the angle of inclination would be less. The downwardly extending projecting parts $b^6$ of the cover $b$ are preferably provided to engage with the tracks $a^9$ immediately the cover $b$ is moved longitudinally for opening and may be adapted to co-operate with the inwardly directed edges of said tracks whereby lateral displacement of the cover $b$ during opening and closing may be prevented. In place of the interlocking projections $a^{10}$ and recesses $b^8$, a locking screw or other locking device or devices may be provided at each end of the cover $b$. For small size covers and the like the tracks may be dispensed with.

In a modified construction as shown in Figure 5, adapted more particularly for use with manholes and the like of comparatively large size, the cover or grating is made in two halves $b^{10}$, $b^{11}$ adapted to seat one against the other at their adjacent edges by the provision of a bevelled or inclined seating $b^{12}$ on one part (for example, $b^{10}$) upon which a corresponding undercut seating $b^{13}$ on the other part $b^{11}$ rests, the respective seatings $b^{12}$, $b^{13}$ being provided if desired with co-operating sealing grooves or recesses $b^{14}$ such as hereinbefore referred to for the purpose of obtaining a fluid and gas tight joint at the junction of the two parts $b^{10}$, $b^{11}$. The remaining sides of the parts $b^{10}$, $b^{11}$ of the cover $b$ are provided with bevelled or inclined seating $b^1$ adapted to co-operate with the bevelled or inclined seatings $a^7$ in the frame $a$. A downwardly extending transverse flange $b^6$ is provided on each part $b^{10}$, $b^{11}$ of the cover at the adjacent ends thereof to co-operate with pairs of oppositely arranged tracks $a^0$, such as before described, running up from positions adjacent the middle of the frame $a$, while each part $b^{10}$, $b^{11}$ of the cover may be provided with a lifting handle $b^5$ or equivalent device and if desired also with locking means such as the screw $b^7$ shown in Figures 1, 2 and 3. Such flanges $b^6$ serve also to strengthen the cover.

As shown in Figure 6, a modified form of seating may be employed in which comparatively large, longitudinally extending grooves or recesses $b^{15}$, $a^{11}$ respectively in the cover $b$ and the frame $a$ are provided so that the seatings $b^1$, $a^7$ engage with one another for only a short distance from their upper and lower edges. Such grooves or recesses $b^{15}$, $a^{11}$ may be interrupted by webs which are coincident with the strengthening webs $a^6$ and $b^2$, $b^3$, for example, as shown in Figure 11 hereinafter described. This arrangement enables a more accurate seating of the cover to be obtained. The grooves or recesses $b^{15}$, $a^{11}$ may be filled or partially filled with grease or oil or even water to form a seal as before described.

In the application of the invention to a concrete filled cover as shown in Figures 7, 8 and 9, more particularly for electrical and other purposes where the cover is required for use in pavements and the like where it will not be subjected to very heavy loads, and in cases where the cover does not require to be opened at frequent intervals, the frame $a$ is made in four parts or sections $a^1$, $a^2$ joined together at the corners in the manner before described. As an alternative to the ledges $a^9$ (Figures 1, 2 and 3), the seatings $a^7$ of the opposite side members $a^1$ of the frame are extended downwardly and inwardly to provide tracks with which bevelled parts $c^1$ on downwardly extending members $c$ bolted or otherwise secured to one end of the cover $b$ are adapted to engage. Adjacent the end of the frame at which the end of the cover fitted with the members $c$ is normally disposed, the bevelled or inclined seatings $a^7$ of the side members $a^1$ of the frame are of reduced width, or may be slotted as shown for example in Figure 13, and inclined tracks $a^{12}$ are provided upon the inner sides of the members $a^1$ to extend from positions adjacent the bottom of the end members $a^2$ upwardly at a suitable inclination so that they run into the horizontal tracks formed by the extended parts of the seatings $a^7$. The cover $b$ may be cast in one piece but preferably, as shown, is made in four parts, i. e., two side members $b^{16}$ and two end members $b^{17}$ provided with mitred ends and held together by means such as angle brackets $d$ at the inside bolted to the respective parts. In order to facilitate the casting and moulding operation it has been found advantageous to construct the members $b^{16}$, $b^{17}$ of the cover of the cross section shown comprising a horizontal outwardly extending part carrying the seating $b^1$ and a horizontal inwardly extending part serving for the support of the concrete filling $e$ and the reinforcement therefor, the two horizontal parts being joined by a vertical wall and strengthening ribs $b^{18}$ being provided to support and give rigidity to the seating $b^1$. The reinforcement for the concrete filling $e$ may comprise parallel disposed lengths $e^1$ of wire, for example of about $\frac{1}{8}''$ diameter, supported upon studs $b^{21}$ and held in position by means such as screws $b^{22}$, the wires $e^1$ being assembled to form an open mesh. In addition single lengths $e^2$ of stouter wire may be arranged to extend both longitudinally and transversely so as to intersect in a central position, these wires $e^2$ being preferably slightly bowed and resting at their ends in the angle formed at the junction of the lower inwardly extending horizontal part and the vertical wall of the frame sections $b^{16}$, $b^{17}$. Any other suitable form of reinforcement may however be employed. Thus wire mesh or other woven or similar reinforcing material may be cut to size so that when bowed or distorted it may be introduced within the cover $b$ so as to rest in the angle at the inside thereof.

For the purpose of ensuring an effective joint between adjacent sections of the frame $a$, and preferably also of the cover $b$, at the corners, the mitred ends of the sections may be provided with shallow recesses $a^{13}$, $b^{19}$ (Figure 10) which, when the sections are assembled together, form chambers $f$ (Figures 3 and 9) for the reception of keying metal such as hardened lead or type metal which, after the sections are bolted together, is poured into the chambers through openings formed for example by grooves or recesses or cut away parts $b^{20}$, $a^{14}$ which extend respectively upwardly and downwardly. The bolts $a^5$ securing the sections of the frame $a$ together extend through clearance holes $a^{15}$ in the ends of the sections and consequently through the respective chambers $f$.

Advantageously, as shown in Figure 10a, the recesses $a^{13}$, $b^{19}$ may be of dovetail form so that the metal key securely holds the sections together even if the bolts $a^5$ or brackets $d$ become slack.

In assembling a frame and cover constructed as shown in Figures 7, 8, 9 and 10, the sections $a^1$, $a^2$ or $b^{16}$, $b^{17}$ of the frame or of the cover, respectively, are assembled upon a block having seatings corresponding to the seatings on the respective cover or frame, the parts being bolted together and keyed at the corners by running metal into the chambers $f$ as before described. The assembled frame or cover, as the case may be, is then inverted and the sections of the cover or frame to be assembled are then laid in position thereon and bolted together, the corners being finally keyed in a similar manner to the corners of the frame. In the case of single or two-part covers as shown in Figures 1 to 6, the frame may be assembled directly upon the cover, which latter is inverted for the purpose. It will be understood that the corners of the frame shown in Figures 1 to 6 are preferably keyed together in like manner to that described with reference to Figures 7 to 10.

For use in roads or other places where the cover or the like may be subjected to very heavy loads, the cover $b$ may be cast in one piece (see Figure 11) with transverse and longitudinal ribs forming partitions $b^{23}$ splayed out at the bottom to form cells having their lower parts of downwardly tapering, substantially conical or other suitably constricted shape for the reception and support of concrete filling $e$. Tracks $a^{12}$ similar to those shown in Figure 7 may be provided for co-operation with suitable downwardly projecting guide or runner parts $c$ fitted or cast upon the cover $b$. The frame $a$ is of considerably heavier construction and is preferably provided with outwardly extending vertical strengthening ribs and also inwardly extending vertical ribs $a^{13}$. The grooves or recesses $a^8$ in the inclined seating faces $a^7$ in the frame $a$ may be of substantial width and of comparatively shallow depth and may be interrupted by ribs $a^{14}$ serving to give additional strength to the seatings. Similar ribs may be provided across the grooves or recesses $b^4$ in the seatings $b^1$ upon the cover $b$.

In the modification illustrated in Figure 12, the vertical partitions $b^{23}$ are extended substantially to the bottom of the cover $b$ and are integrally formed with lateral flanges $b^{24}$ so as to provide substantially rectangular cells adapted for the reception of wood blocks $g$. A concrete filling may be used with this construction if desired.

Generally, if no means are provided for locking the cover, it is desirable to provide stops to prevent any possibility of lateral movement of the cover on its seating as by the action of traffic, such stops conveniently being formed by continuations or extensions $b^{25}$ of the longitudinal and transverse strengthening webs on the underside of the cover.

In the application of the invention to a street grating or the like and with reference to Figures 13, 14 and 15, the grating $h$ or the like may be cast in one piece with a longitudinal central rib $h^1$ and transverse ribs $h^2$ forming slots $h^3$ therebetween, or such slots may be otherwise arranged. The frame $a$ is constructed in four sections as hereinbefore described, and may be provided with inclined tracks $a^{12}$, similar to those shown in Figures 7 and 11, adapted to co-operate with downwardly extending guides or runners $b^4$, on the grating $h$. The seating $a^7$ in the frame $a$ may be extended so as to project above the inclined tracks $a^{12}$, recesses $a^{16}$ being provided to permit the passage of the co-operating projections $h^4$. For gratings and the like, it may be unnecessary to provide the metal keys at the corners as hereinbefore described, though they may be applied if desired. Longitudinal sealing grooves or recesses in the inclined seatings are not necessary and may be dispensed with. The sections of the frame may be assembled directly upon the grating $h$.

The advantages of the sectional construction of manhole cover or the like according to the invention may be summarized as follows:—The moulding and casting is simplified, more especially as the use of large central cores supported by grids is obviated, and the cost of moulding and casting is materially reduced. Furthermore, it is possible to cast the parts very accurately so that a minimum of fettling, grinding or machining, which can be very readily effected, inasmuch as the seatings are straight and easily accessible, is required. A perfect seating may be secured and, consequently, a cover or the like possessing great strength, while of a comparatively light construction requiring less metal, may be obtained. Furthermore, owing to the perfect seating obtained, the necessity for the usual liquid seals is avoided and, consequently, the difficulties associated with dirt falling into such seals and also rocking and breakage due to uneven bearing. A further advantage is that a large number of sizes of manhole covers or the like may be built up from stock parts of standard size, thereby effecting very considerable saving in the cost of moulding and production.

It will be understood that the invention is not limited to the constructions hereinbefore described.

It will be appreciated that the co-operating seatings of the frames and covers or gratings constructed in accordance with the present invention may be readily fettled, ground or machined, for example by mounting the cover or grating or the straight frame sections upon a suitable carriage or table and traversing them with respect to a grinding wheel, milling cutter or the like. The mitred ends of the frame sections and, also, of the sections of the cover or grating when so constructed, may be similarly machined if desired. Furthermore any other equivalent arrangement of tracks for facilitating the removal and replacement of the cover or grating may be employed. Thus the tracks may be horizontal or substantially horizontal throughout their length, and the downwardly extending projections, guides or runners on the cover or grating may be provided with inclines adapted to co-operate with the tracks in such manner that the respective end of the cover or grating is raised during the first part of the opening movement thereof for the purpose before described.

I claim as my invention:—

1. A manhole or like construction, comprising a rectangular cast metal frame embodying a plurality of coordinate sections bolted together at adjacent corners to provide a rigid structure, and a rectangular cast metal cover seated on the frame; said frame and cover having inwardly-directed beveled or inclined seating faces which conformably fit directly against each other; the cooperating faces of the corner portions of the sections of the frame being provided with recesses forming chambers for the reception of metal keys to accommodate irregularities.

2. A manhole or like construction according to claim 1, in which the cooperating faces of the corner portions have openings leading into the key recesses to enable the keying metal to be poured thereinto.

3. A manhole or like construction, comprising a rectangular frame embodying a plurality of coordinate sections fastened together at the corners, a rectangular cover seated on the frame; said frame and cover having beveled or inclined seating faces which conformably fit directly against each other; parallel tracks on the frame at opposite sides thereof, and depending projections on one end of the cover to engage and travel along the tracks when said cover is moved endwise in one or the other direction.

4. A manhole or like construction according to claim 3, in which means are provided for raising the cover during its movement in one direction so as to clear the adjacent end wall of the frame, and for lowering it during the return movement.

5. A manhole or like construction according to claim 3, in which the tracks include upwardly-inclined portions for raising the cover during its movement in one direction so as to clear the adjacent end wall of the frame, and for lowering it during the return movement.

6. A manhole or like construction according to claim 3, in which the tracks include portions that run at one end into the adjacent seating face on the frame.

7. A manhole or like construction according to claim 3, in which the tracks include upwardly-inclined portions that run into the adacent seating face on the frame.

In testimony whereof I have signed my name this 17th day of November, 1928.

VIVIAN ELKINGTON.